United States Patent
Pavlovich et al.

(10) Patent No.: US 9,042,661 B2
(45) Date of Patent: May 26, 2015

(54) OBJECT CLASSIFICATION USING TWO-DIMENSIONAL PROJECTION

(75) Inventors: Julia Pavlovich, Cambridge, MA (US); Zhengrong Ying, Belmont, MA (US); Ram Naidu, Newton, MA (US)

(73) Assignee: Analogic Corporation, Peabody, MA (US)

(*) Notice: Subject to any disclaimer, the term of this patent is extended or adjusted under 35 U.S.C. 154(b) by 111 days.

(21) Appl. No.: 13/876,131

(22) PCT Filed: Sep. 30, 2010

(86) PCT No.: PCT/US2010/050825
§ 371 (c)(1),
(2), (4) Date: Mar. 26, 2013

(87) PCT Pub. No.: WO2012/044296
PCT Pub. Date: Apr. 5, 2012

(65) Prior Publication Data
US 2013/0202217 A1 Aug. 8, 2013

(51) Int. Cl.
*G06K 9/68* (2006.01)
*G06K 9/62* (2006.01)
*G06T 11/00* (2006.01)

(52) U.S. Cl.
CPC .......... *G06K 9/6202* (2013.01); *G06K 2209/09* (2013.01); *G06T 11/008* (2013.01); *G06K 9/6214* (2013.01)

(58) Field of Classification Search
CPC ................... G06T 2207/10016; G06T 7/2033; G06T 7/0083; G06T 7/20; G06K 9/00771; G06K 9/3241; G06K 9/6202; G06K 9/4647

USPC .................................. 382/218, 103, 199, 170
See application file for complete search history.

(56) References Cited

U.S. PATENT DOCUMENTS 6,067,366 A * 5/2000 Simanovsky et al. ......... 382/100
(Continued)

OTHER PUBLICATIONS

International Search Report cited in related application No: PCT/US2010/050825 dated Apr. 15, 2011.
(Continued)

*Primary Examiner* — Ruiping Li
(74) *Attorney, Agent, or Firm* — Cooper Legal Group LLC

(57) ABSTRACT

One or more systems and/or techniques are provided to identify objects comprised in a compound object without segmenting three-dimensional image data of the potential compound object. Two-dimensional projections of a potential compound object (e.g., Eigen projections) are examined to identify the presence of known objects. The projections are compared to signatures, such as morphological characteristics, of one or more known objects. If it is determined based upon the comparison that there is a high likelihood that the compound object comprises a known object, a portion of the projection is masked, and it is compared again to the signature to determine if this likelihood has increased. If it has, a sub-object of the compound object may be classified based upon characteristics of the known object (e.g., the compound object may be classified as a potential threat item if the known object is a threat item).

22 Claims, 7 Drawing Sheets

(56) References Cited

U.S. PATENT DOCUMENTS

| | | | |
|---|---|---|---|
| 6,078,642 | A | 6/2000 | Simanovsky et al. |
| 6,128,365 | A | 10/2000 | Bechwati et al. |
| 6,345,113 | B1 | 2/2002 | Crawford et al. |
| 2005/0238232 | A1 | 10/2005 | Ying et al. |
| 2009/0226033 | A1 | 9/2009 | Sefcik |
| 2010/0183209 | A1 | 7/2010 | Litvin et al. |

OTHER PUBLICATIONS

Korean Office Action cited in Korean Application No. 2013-531546 dated Jul. 1, 2014, 9 pgs.

EP Communication cited in Ep Application No. 10765537.5 dated May 8, 2013, 2 pgs.

Reply EP Communication cited in EP Application No. 10765537.5 dated May 8, 2013, 7 pgs.

* cited by examiner

OBJECT CLASSIFICATION USING TWO-DIMENSIONAL PROJECTION

BACKGROUND

The present application relates to the field of x-ray and computed tomography (CT). It finds particular application with CT security scanners. It also relates to medical, security, and other applications where identifying sub-objects of a compound object would be useful.

Security at airports and in other travel related areas is an important issue given today's sociopolitical climate, as well as other considerations. One technique used to promote travel safety is baggage inspection. Often, an imaging apparatus is utilized to facilitate baggage screening. For example, a CT device may be used to provide security personnel with two and/or three dimensional views of objects. After viewing images provided by the imaging apparatus, security personnel may make a decision as to whether the baggage is safe to pass through the security check-point or if further (hands-on) inspection is warranted.

Current screening techniques and systems can utilize automated object recognition in images from an imaging apparatus, for example, when screening for potential threat objects inside luggage. These systems can extract an object from an image, and compute properties of these extracted objects. Properties of scanned objects can be used for discriminating an object by comparing the object's properties (e.g., density, shape, atomic characteristics, etc.) with known properties of threat items, non-threat items, or both classes of items. It can be appreciated that an ability to discriminate potential threats may be reduced or degraded if an extracted object comprises multiple distinct physical objects. Such an extracted object is referred to as a compound object.

A compound object can be made up of two or more distinct items, at times referred to herein as sub-objects. For example, if two items are lying side by side and/or touching each other, a security scanner system may extract the two items as one single compound object. Because the compound object actually comprises two separate objects, however, properties of the compound object may not be able to be effectively compared with those of known threat and/or non-threat items. As such, for example, luggage containing a compound object may unnecessarily be flagged for additional (hands-on) inspection because the properties of the compound object resemble properties of a known threat object. This can, among other things, reduce the throughput at a security checkpoint. Alternatively, a compound object that should be inspected further may not be so identified because properties of a potential threat object in the compound object are "contaminated" or combined with properties of one or more other (non-threat) objects in the compound object, and these "contaminated" properties (of the compound object) might more closely resemble those of a non-threat object than those of a threat object, or vice versa.

Numerous techniques have been developed to separate a compound object into its sub-parts and improve threat item detection, and thereby increase the throughput and effectiveness at a security check-point. One of the more common techniques is compound object splitting. Compound object splitting essentially identifies potential compound objects and splits them into sub-objects using a histogram-based compound object splitting algorithm. Other techniques include using surface volume erosion to split objects. However, using erosion as a stand-alone technique to split compound objects can lead to undesirable effects. For example, erosion can reduce a mass of an object, and indiscriminately split objects that are not compound, and/or fail to split some compound objects. Additionally, in these techniques, erosion and/or splitting may be applied universally, without regard to whether an object is a potential compound object at all.

SUMMARY

Aspects of the present application address the above matters, and others. According to one aspect, a method for classifying a potential compound object without segmentation of image data of the potential compound object is provided. The method comprises generating a first fidelity score for a projection of the potential compound object, where the fidelity score represents a likelihood that the potential compound object comprises a comparator characteristic of a known object. The method also comprises, if the first fidelity score meets a first threshold, generating a masked projection of the potential compound object by excluding portions of the projection of the potential compound object that comprises outliers to the comparator characteristic. The method further comprises generating a second fidelity score for the masked projection of the potential compound object using the comparator characteristic of the known object.

According to another aspect, a system for classifying a potential compound object without performing segmentation of image data of the potential compound object is provided. The system comprises a fidelity score generator configured to generate a first fidelity score for a projection of the potential compound object that represents a likelihood that one or more portions of the potential compound object comprise a comparator characteristic of a known object. The system also comprises a masking component configured to generate a masked projection of the potential compound object by masking out one or more portions of the projection of the potential compound object that comprise outliers to the comparator characteristic, if the first fidelity score meets a first threshold. The system further comprises a classification component configured to classify one or more portions of the potential compound object using the comparator characteristic if a second fidelity score from the masked projection meets a second threshold.

According to another aspect, a method for classifying a potential compound object identified in image data from a radiographic imaging apparatus is provided. The method comprises generating an Eigen edge map of an Eigen space representation of the potential compound object, where the Eigen edge map comprises merely a boundary representation of the potential compound object in Eigen space. The method also comprises comparing a signature of the Eigen edge map with a signature of a known object characteristic to generate a first likelihood score and removing portions of the Eigen edge map representation that meet a removal threshold based on the known object characteristic to generate a masked Eigen edge map, if the first likelihood score meets a first threshold. The method further comprises comparing a signature of the masked Eigen edge map with the signature of the known object characteristic to generate a second likelihood score.

Those of ordinary skill in the art will appreciate still other aspects of the present invention upon reading and understanding the appended description.

DETAILED DESCRIPTION

Figure 1:
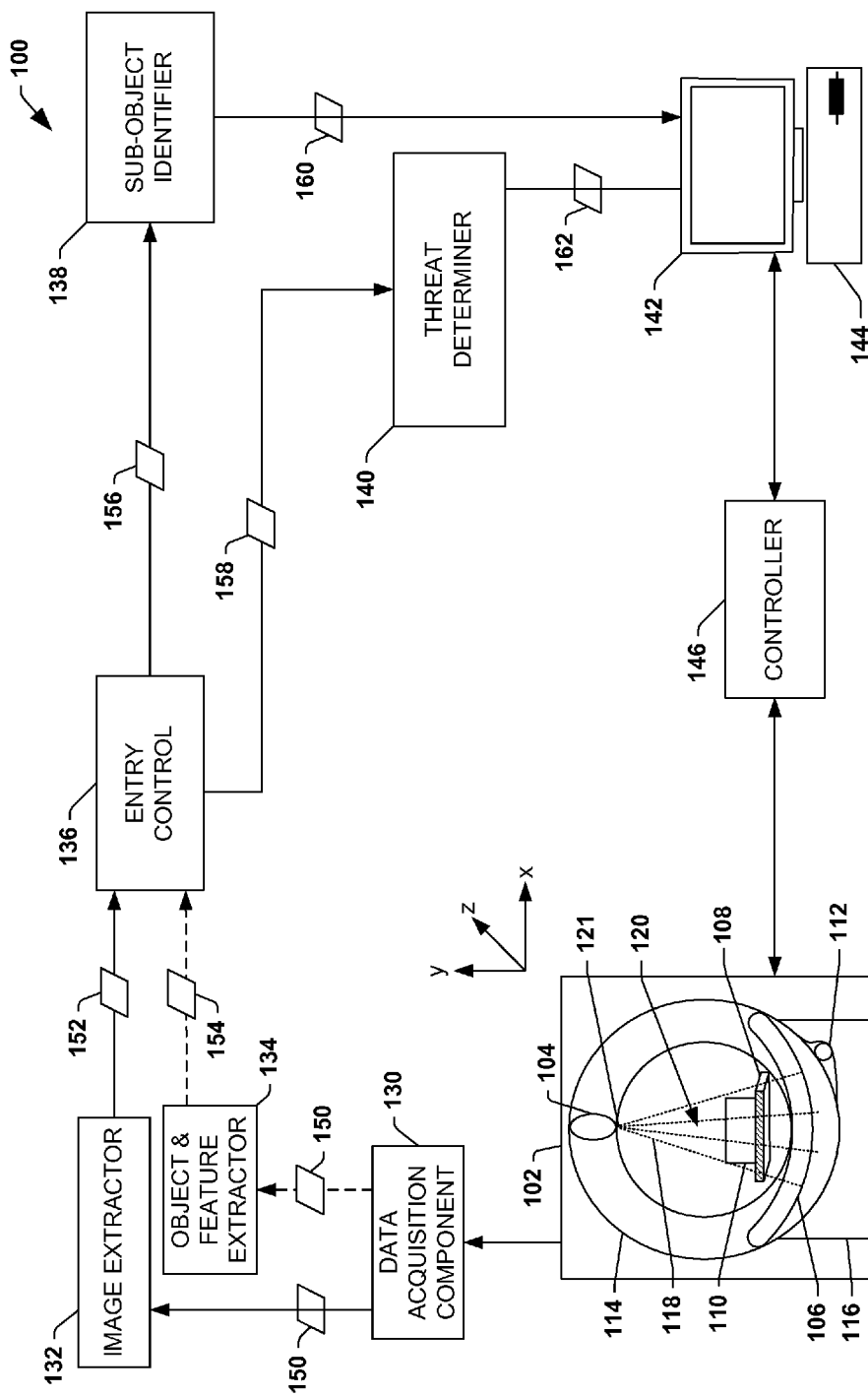
FIG. 1 is a schematic block diagram illustrating an example scanning environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques for identifying a portion of a compound object in an image generated by subjecting one or more objects to imaging using an imaging apparatus (e.g., a computed tomography (CT) image of a piece of luggage under inspection at a security station at an airport) are provided herein. That is, one or more techniques and/or systems for identifying one or more sub-objects of a compound object are provided.

FIG. 1 is an illustration of an example environment 100 in which a system and/or method may be employed for identifying potential threat containing objects, from a class of objects, inside a container that has been subjected to imaging using an imaging apparatus (e.g., a CT scanner). In the example environment 100 the imaging apparatus comprises an object examination apparatus 102, such as a security scanning apparatus (e.g., used to scan luggage at an airport). The examination apparatus 102 may be used to examine and/or scan one or more objects 110 (e.g., a series of suitcases at the airport). The examination apparatus 102 typically comprises a rotating gantry portion 114 and a stationary gantry portion 116 (e.g., where the rotating portion 114 rotates in an x, y plane in the illustrated example).

The rotating gantry portion 114 comprises a radiation source 104 (e.g., an X-ray tube), an array of radiation detectors 106 (e.g., an X-ray detectors), and a rotator 112 (e.g., a gantry motor) for rotating the rotating gantry portion 114 (e.g., including the radiation source 104 and detectors 106) around the object(s) being scanned 110. In one example, the detector 106 is mounted on a substantially diametrically opposite side of the rotating gantry portion 114 relative to the radiation source 104 (e.g., where a focal spot 121 of the radiation source 104 would generally serve as a center of the detector array 106 should the detector array completely encircle the radiation source 104). An examination surface 108 (e.g., a conveyor belt) passes through a hole in the rotating gantry portion 114 and may be configured to convey the object(s) 110 from an upstream portion of the examination apparatus 102 to a downstream portion (e.g., into and/or out of the page in a z direction in the illustrated example).

As an example, a computed tomography (CT) security scanner 102 that includes an X-ray source 104, such as an X-ray tube, can generate a fan, cone, wedge, or other shaped beam of X-ray radiation 118 that traverses one or more objects 110, such as suitcases, in an examination region 120. In this example, the X-rays are emitted by the source 104, traverse the examination region that contains the object(s) 110 to be scanned, and are detected by an X-ray detector 106 across from the X-ray source 104. Further, a rotator 112, such as a gantry motor drive attached to the scanner, can be used to rotate the X-ray source 104 and detector 106 around the object(s) 110, for example. In this way, X-ray projections from a variety of perspectives of the object can be collected, for example, creating a set of X-ray projections for the object(s). While illustrated with the x-ray source 104 and detector 106 rotating around an object, it will be appreciated that, in another example, the radiation source 104 and detector 106 may remain stationary while the object 110 is rotated.

In the example environment 100, a data acquisition component 130 is operably coupled to the examination apparatus 102 and is typically configured to collect information from the detector 106. The data acquisition component 130 may also be used to compile the collected information into projection space data 150 for an object 110. As an example, X-ray projections may be acquired at each of a plurality of angular positions with respect to the object 110. Further, as the object(s) 110 is conveyed from an upstream portion of the object scanning apparatus 102 to a downstream portion (e.g., conveying objects parallel to the rotational axis of the rotating gantry portion 114 (into and out of the page)), the plurality of angular position X-ray projections may be acquired at a plurality of points along the axis of rotation with respect to the object(s) 110. In one embodiment, the plurality of angular positions may comprise an X and Y axis with respect to the object(s) being scanned, while the rotational axis may comprise a Z axis with respect to the object(s) being scanned.

In the example environment 100, an image extractor 132 is coupled to the data acquisition component 130, and is configured to receive the projection space data 150 from the data acquisition component 130 and generate three-dimensional image data 152 indicative of the scanned object 110 using a suitable analytical, iterative, and/or other reconstruction technique (e.g., backprojecting from projection space to image space).

In one embodiment, the three-dimensional image data 152 for a suitcase, for example, may ultimately be displayed on a monitor 142 of a terminal 144 (e.g., desktop or laptop computer) for human observation. In this embodiment, an operator may isolate and manipulate the image, for example, rotating and viewing the suitcase from a variety of angles, zoom levels, and positions.

It will be appreciated that, while the example environment 100 utilizes the image extractor 132 to extract three-dimensional image data 152 from the projection space data 150 generated by the data acquisition component 130, for example, for a suitcase being scanned, the techniques and systems, described herein, are not limited to this embodiment. In another embodiment, for example, three-dimensional image data may be generated by an imaging apparatus that is not coupled to the system. In this example, the three-dimensional image data may be stored onto an electronic storage device (e.g., a CD-ROM, hard-drive, flash memory) and delivered to the system electronically.

In the example environment 100, in one embodiment, an object and feature extractor 134 may receive the projection space data 150 from the data acquisition component 130 for example, in order to extract objects and features 154 from the scanned items(s) 110 (e.g., a carry-on luggage containing items). It will be appreciated that the systems, described herein, are not limited to having an object and feature extractor 134 at a location in the example environment 100. For example, the object and feature extractor 134 may be a component of the image extractor 132, whereby three-dimensional image data 152 and object features 154 are both sent from the image extractor 132. In another example, the object and feature extractor 134 may be disposed after the image extractor 132 and may extract object features 154 from the three-dimensional image data 152. Those skilled in the art may devise alternative arrangements for supplying three-dimensional image data 152 and object features 154 to the example system, including originating from an external, remote, decoupled, etc. system.

In the example environment 100, an entry control 136 may receive three-dimensional image data 152 and object features 154 for the one or more scanned objects 110. The entry control 136 can be configured to identify a potential compound object in the three-dimensional image data 152 based on an object's features. In one embodiment, the entry control 136 can be utilized to select objects that may be compound objects 156 for processing by a sub-object identifier 138. In one example, object features 154 (e.g., properties of an object in an image, such as an Eigen-box fill ratio) can be computed prior to the entry control 136 and compared with pre-determined features for compound objects (e.g., features extracted from known compound objects during training of a system) to determine whether the one or more objects likely comprise compound objects. In another example, the entry control 136 calculates the density of a potential compound object and a standard deviation of the density. If the standard deviation is outside a predetermined range, the entry control 136 may identify the object as a potential compound object. Three dimensional image data 158 indicative of objects that are not determined to be potential compound objects by the entry control 136 and/or objects that are not able to be separated by the sub-object identifier 138 (e.g., because one of the sub-objects in the compound object is significantly larger than another sub-object) may not be sent through the sub-object identifier 138. Stated differently, the entry control 136 may function as a filter that identifies three-dimensional image data 156 indicative of compound objects that has the possibility of being separated from three-dimensional image data 158 indicative of single objects and/or compound objects that cannot be separated into sub-objects.

In the example environment 100, the sub-object identifier 138 receives three-dimensional image data 156 indicative of a potential compound object from the entry control 136. The sub-object identifier 138 is configured to determine a characteristic(s) of one or more sub-objects comprised in the compound object. For example, the sub-object identifier 138 may be configured to identify a dominant sub-object in the compound object and/or to identify whether a sub-object is a potential threat item.

As will be described in more detail below, the sub-object identifier 138 determines a characteristic(s) of one or more sub-objects by projecting the three-dimensional image data 156 indicative of the compound object onto a two-dimensional projection (e.g., modeled on Eigen space, for example). Using such a two-dimensional projection, a characteristic(s) of one or more sub-objects of the compound object can be identified by masking portions of the projection until substantially a single (e.g., dominant) sub-object remains unmasked. It will be appreciated that in one embodiment this technique of masking portions of the projection to identify a sub-object, or rather a characteristic of the sub-object, such as whether the sub-object is a potential threat item, for example, can be repeated until one or more characteristics of respective sub-objects are identified (e.g., until projection data indicative of respective sub-objects comprised in the compound object are identified).

Information pertaining to the identified sub-object 160, such as whether the sub-object is a potential threat item and/or a non-threat item may be sent to the terminal 144 and displayed to a user on the monitor 142. Further, in one embodiment, the three-dimensional image data 156 may be transmitted to the terminal 144. In this way, a user can be informed of a potential threat item and view three-dimensional image data related to the identified potential threat item, for example.

In the example environment 100, a threat determiner 140 can receive three-dimensional image data 158 that was not identified as associated with a potential compound object (or was identified as a potential compound object from which characteristics of one or more sub-objects could not be identified (e.g., because a dominant sub-object dwarfs other sub-objects)). The threat determiner 140 is configured to determine whether the object represented by the three-dimensional image data 158 is a potential threat item and/or non-threat item. For example, in one embodiment, the threat determiner 140 can be configured to compare properties or characteristics of the object (e.g., density, shape, material characteristics, etc.) to properties of known threat items to determine whether the object is a potential threat item. It will be appreciated that the one or more systems and/or techniques provided herein are not limited to utilizing a threat determiner 140, and may be utilized for identifying data indicative of sub-objects without a threat determiner 140. For example, three-dimensional image data 158 indicative of a single object and/or information pertaining to identified sub-objects 160 may be sent to the terminal 144 wherein one or more images of the object under examination 110 may be displayed for human observation (e.g., threat objects are determined manually).

Information concerning whether a scanned object is a potential threat item 162 can be sent to the terminal 144 and can be displayed for viewing by security personal at a luggage screening checkpoint, for example. In this way, in this example, real-time information can be retrieved for objects subjected to examination by an examination apparatus 102.

In the example environment 100, a controller 146 is operably coupled to the terminal 144. The controller 146 receives commands from the terminal 144 and generates instructions for the object scanning apparatus 102 indicative of operations to be performed. For example, a human operator may want to rescan the object 110 and the controller 144 may issue an instruction instructing the examination surface 108 to reverse direction (e.g., bringing the object back into an examination region of the object scanning apparatus 102).

It will be appreciated to those skilled in the art that FIG. 1 merely illustrates an example environment for an imaging scanner and is not intended to limit the scope of the invention. For example, in another embodiment, information pertaining to identified sub-objects 160 may be transmitted to an image reconstructor (not shown) that is configured to convert the two-dimensional projection back into three-dimensional image data using analytical or iterative techniques known to those skilled in the art (e.g., backprojection from two-dimensional space to three-dimensional space).

Figure 2:
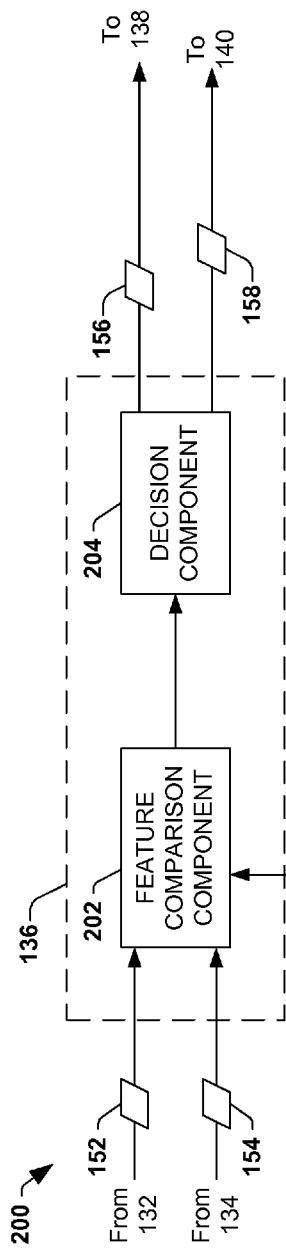
FIG. 2 is a component block diagram illustrating one or more components of an environment wherein sub-object identification may be implemented as provided herein.

FIG. 2 is a component block diagram illustrating one embodiment 200 of an entry control 136, which can be configured to identify a potential compound object based on features of the object. As illustrated, the entry control 136 comprises a feature comparison component 202, which can be configured to compare the respective one or more feature values 154 to a corresponding feature threshold 250.

In one embodiment, image data 152 for an object in question can be sent to the entry control 136, along with one or more corresponding feature values 154. In this embodiment, feature values 154 can include, but not be limited to, an object's shape properties, such as an Eigen-box fill ratio (EBFR) for the object in question. As an example, objects having a large EBFR typically comprise a more uniform shape; while objects having a small EBFR typically demonstrate irregularities in shape. In this embodiment, the feature comparison component 202 can compare one or more object feature values with a threshold value for that object feature, to determine which of the one or more features indicate a compound object for the object in question. In another embodiment, the feature values 154 can include properties related to the average density of the object and/or the standard deviation of densities of portions of the object. The feature comparison component 202 may compare the standard deviation of the densities to a threshold value to determine whether a compound object may be present.

In the example embodiment 200, the entry control 136 can comprise a decision component 204, which can be configured to identify a potential compound object based on results from the feature threshold comparison component 202. In one embodiment, the decision component 204 may identify a potential compound object based on a desired number of positive results for respective object features, the positive results comprising an indication of a potential compound object. As an example, in this embodiment, a desired number of positive results may be one hundred percent, which means that if one or more of the object features indicates a non-compound object, the image data 158 for the object may not be sent to the sub-object identifier 138. However, in this example, if the object in question has the desired number of positive results (e.g., all of them) then the image data 156 for the potential compound object can be sent to the sub-object identifier 138. In another example, the entry decision component 204 may identify a potential compound object when the standard deviation exceeds a predefined threshold at the feature comparison component 202.

Figure 3:
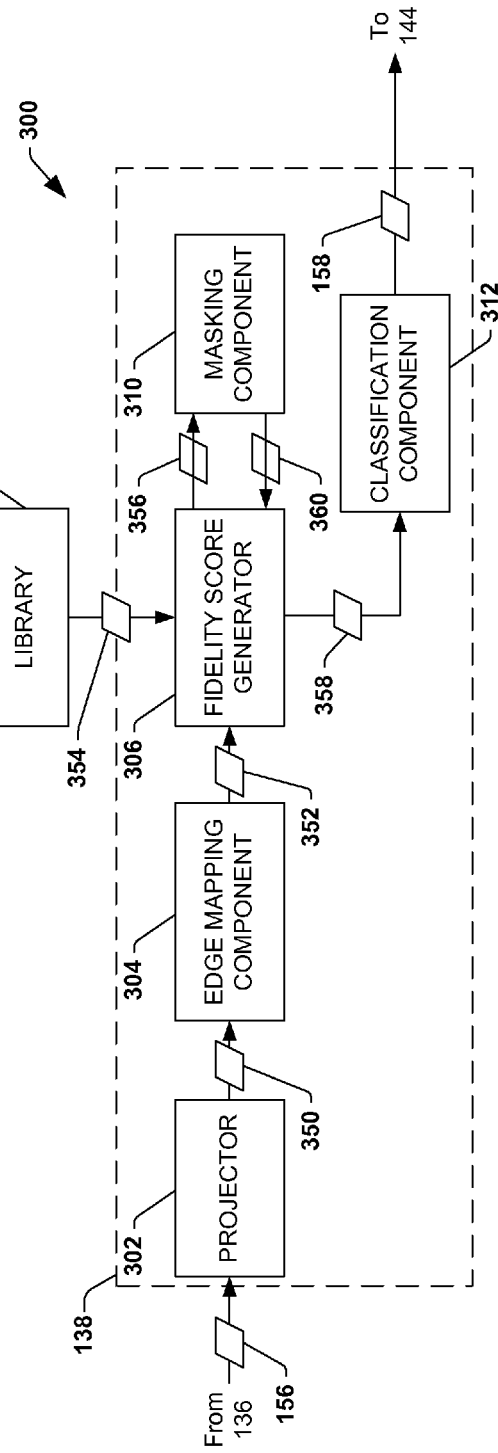
FIG. 3 is a component block diagram illustrating details of one or more components of an environment wherein sub-object identification may be implemented as provided herein.

FIG. 3 is a component block diagram of one example embodiment 300 of a sub-object identification component 138, which can be configured to identify a characteristic(s) of one or more sub-objects from three-dimensional image data 156 indicative of a potential compound object. For example, in one embodiment, the sub-object identification component 138 is configured to classify a sub-object of a compound object as a potential threat and/or non-threat item.

The example embodiment of the sub-object identification component 138 comprises a projector 302 configured to receive the three-dimensional image data 156 indicative of the potential compound object. The projector 302 is also configured to convert the three-dimensional image data 156 indicative of the potential compound object into a two-dimensional projection 350 indicative of the potential compound object. It will be understood to those skilled in the art that the projection is a two-dimensional representation of a three-dimensional function. For example, a two-dimensional atlas of a portion of a globe may be considered a two-dimensional projection. While a point on the two-dimensional atlas may not correspond perfectly with a corresponding point on a three-dimensional globe when viewed in the context of neighboring points (e.g., because of the lack of a z-dimension, for example), when viewed individually, or locally (e.g., not in context with neighboring points), the point is a substantially perfect representation of the corresponding point on the three-dimensional globe.

In one example, the two-dimensional projection 350 is an Eigen projection, where two-dimensional planes associated with the projection are normal to respective principal axes of the object, where principal axes generally allow for a greater amount of a surface's area to be viewed. It will be appreciated that the principal axis may vary according to the shape and/or orientation of the compound object. For example, where a book is tilted at a 45 degree angle relative an examination surface (e.g., 108 in FIG. 1), the principle x-axis may be determined to tilt at an angle of 45 degrees relative to the examination surface such that the portion of the book having the largest surface area is parallel to the x-axis.

A pixel in the two-dimensional projection 350 represents one or more voxels of the three-dimensional image data 156. The number of voxels that are represented by a given pixel may depend upon the number of object voxels that are "stacked" in a dimension of the three-dimensional image data 156 that is not included in the two-dimensional projection 350. For example, if at a given x and z coordinate, three voxels are stacked in y-dimension of the three-dimensional image data 156, a pixel corresponding to the given x and z coordinate may represent three voxels in the two-dimensional projection 350. Similarly, a pixel adjacent to the pixel may represent five voxels if at a second x and z coordinate, five voxels are stacked in the y-dimension (e.g., the compound object has a larger y-dimension at the x, z coordinates of the adjacent pixel than it does at the pixel). The number of voxels represented by a pixel may be referred to as a "pixel value."

In the example embodiment 300, the sub-object identifier 138 further comprises an edge mapping component 304 which is configured to receive the two-dimensional projection 350 and generate a two-dimensional edge image 352 (also referred to herein as an edge map) from the two-dimensional projection 350 using analytic and/or iterative edge mapping techniques known to those skilled in the art. In one embodiment, the edge mapping component 304 is configured to identify edges of the compound object based upon changes in the pixel values of respective pixels. For example, the edge mapping component may identify a gradient in the pixel values (e.g., the pixel value of respective pixels begin to change from 5 to 0-1) and determine that an edge is located proximate to the gradient. In another embodiment, the edge mapping component 304 is configured to identify the edge as a position where the intensity of the respective pixels begins to change from a maximum value to a value below some threshold value (e.g. 50% of the maximum value). It will be appreciated to those skilled in the art that where the projector 302 is configured to output an Eigen projection, the edge mapping component 304 may be configured to generate an Eigen edge map using the techniques described herein and/or other edge mapping techniques known to those skilled in the art.

The sub-object identifier 138 also comprises a fidelity score generator 306 that is configured to receive the two-dimensional edge image 352 and compute a fidelity score for the edge image 352. Generally, to calculate such a score, the edge image 352 is compared to one or more signatures 354 (also referred to herein as a comparator characteristic) of known objects that are retrieved from a library 308 (e.g., a database) of signatures. The fidelity score is computed based upon the likelihood or probability that one or more portions of the potential compound object comprise the signature 354 to which the edge map is compared. Stated differently, the fidelity score is calculated based upon the similarity and/or differences between the actual edge image 352 and the signature 354 to which the actual edge image 352 is compared. For example, where the signature represents the shape of a known object the fidelity score may be calculated based upon the degree of similarity between the shape of the edge image 352 and the shape represented by the signature 354. In another embodiment, where the signature represents the thickness of a known object, the fidelity score may be calculated based upon the degree of similarity between the thickness of the edge image 352 and the thickness of object represented by the signature 354. Thus, the signature 354 is indicative of one or more characteristics of a known object and the fidelity score is a numerical value (e.g., which, if normalized, would be in the range of about 0 and 1) that indicates the degree of similarity between the edge image 352 and the signature 354. The higher the numerical value, the greater the likelihood that the potential compound object represented by the edge image 352 comprises the signature (and the fewer differences there are between the edge image 352 and the signature 354). It will be appreciated that in one embodiment, the edge image 352 may be compared to a plurality of signatures 354, and thus a plurality of fidelity scores may be generated by the fidelity score generator 306.

If the fidelity score generator 306 generates a fidelity score that is between two predetermined thresholds (e.g., 0.8 and 0.95), the fidelity score generator 306 is configured to transmit the information 356 (e.g., the edge image 352 and the signature 354 which caused the fidelity score between the two thresholds to be generated) to a masking component 310 configured to mask a portion of the edge map 352. In one embodiment, if the fidelity score is below the lower of the two predetermined thresholds, the signature is discarded because the object is not similar enough to the known object represented by the signature to identify a portion of the compound object as being the known object. If the fidelity score is greater than the higher of the two predetermined thresholds, the information 358 (e.g., the edge image 352 and the signature 354 which caused the high fidelity score) may be transmitted directly to a classification component 312 (e.g., without being sent to the masking component 310) because the likelihood that the potential compound object is actually a single, known object is high, for example.

The masking component 310 is configured to receive the information 356 transmitted from the fidelity score generator 306 and generate a masked projection 360 of the potential compound object by masking out one or more portions of the projection of the potential compound object that comprise outliers to the signature using masking techniques known to those skilled in the art. For example, in one embodiment, the masking component 310 is configured to find the center of mass of the object represented by the edge image 352 and to identify sectors of the object (e.g., clusters of pixels) that are not proximate to (e.g., not adjoining) the center of mass. Pixels that are not proximate to the center of mass may be referred to as outliers, and data associated with the outliers is excluded, removed, or otherwise hidden by the masking component 310. Portions of the edge image 352 that are not masked by the masking component 310 (e.g., a masked projection 360) are output to the fidelity score generator 306 and a new fidelity score is computed by comparing the signature 354 which caused the fidelity score between the two thresholds to be generated with the masked projection 360. If the new fidelity score exceeds the higher of the two predetermined thresholds, the masked projection 360 is output to the classification component 312. If the new fidelity score is between the two thresholds, the masked projection may be sent to the masking component 310 to be remasked until the fidelity score generator 306 generates a fidelity score that is greater than second predetermined threshold. Once the masked projection 360 causes the fidelity score generator 306 to generate a fidelity score that is greater than the two predetermined thresholds, the process of remasking and generating a new fidelity score stops and the masked projection 360 and/or information 358 related to the masked projection (e.g., such as the signature to which the masked projection 360 was compared) is output to the classification component 312.

It will be appreciated that in one embodiment, the masked projection component may be compared to a plurality of signatures 354 from the library 308 (e.g., and not merely the signature that it was originally compared with to generate a fidelity score between the two thresholds). If one or more of the signatures 354 to which the masked projection 360 is compared exceeds the higher to the two predetermined thresholds, the fidelity score generator 306 may output the masked projection 360 and/or information 358 related to the masked projection to the classification component 312 for a determination of whether the item comprised in the masked projection 360 is a potential threat.

The classification component 312 is configured to determine whether one or more sub-objects in the potential compound object is a potential threat and/or non-threat item based upon the signature to which the projection, or masked projection, is associated. Stated differently, based upon which signature 354 caused the fidelity score generator 306 to generate a fidelity score that is greater than the second predetermined threshold, the classification component 312 determines whether a sub-object of the compound object is a potential threat item. For example, if the identified signature 354 is a signature of a gun, the classification component 312 may determine that the potential compound object potentially comprises a gun (e.g., a threat item) and may mark it as such. The results of the determination 158 (e.g., which may comprise the two-dimensional projection data itself) are output to a terminal (e.g., 144 in FIG. 1), where they may be reviewed by a user, for example.

Figure 4:
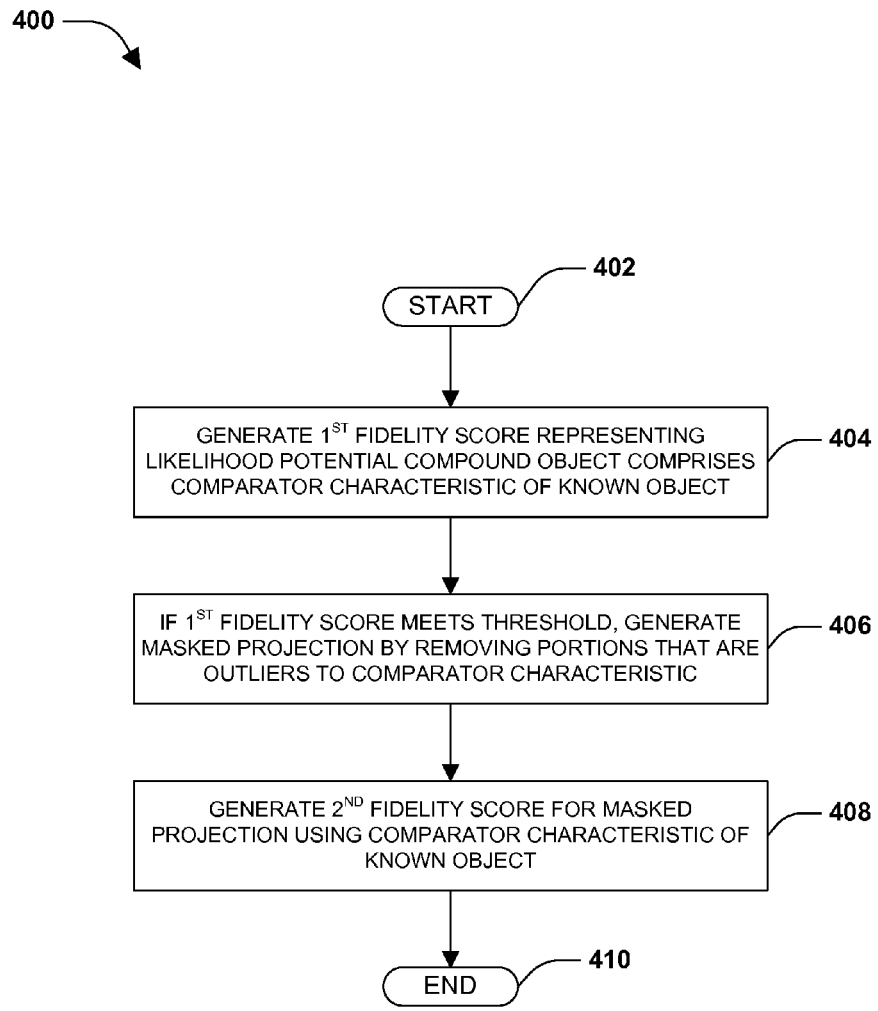
FIG. 4 is a flow chart diagram of an example method for classifying a potential compound object without segmentation of image data.

FIG. 4 illustrates an example method 400 for classifying a potential compound object without requiring segmentation of image data of the potential compound object. The method 400 begins at 402, and a first fidelity score representing the likelihood that a potential compound object comprises a comparator characteristic (e.g., a signature) of a known object is generated at 404.

Generally, to generate a fidelity score, three-dimensional image data indicative of the potential compound object that was generated by an examination (e.g., a CT scan) of the object is converted into a two-dimensional projection, such as an Eigen projection, using techniques known to those skilled in the art. It will be appreciated that to improve the classification of the potential compound object, voxels of the potential compound object are projected onto the two-dimensional projection normal to respective principal axes. That is, as illustrated below in FIG. 6, principle axes of the potential compound object are determined based upon the shape and/or orientation of the potential compound object (e.g., where the axes lie in such a way as to cause the object to appear spread out), and the object is projected (or flattened) along those principal axis.

Once a two-dimensional projection is generated, a boundary image, or edge map, may be created depicting the edges of the potential compound object. It will be appreciated that numerous analytical and/or iterative techniques are known to those skilled in the art for generating a boundary image from a two-dimensional projection. For example, in one embodiment, a boundary image may be generated by thresholding the two-dimensional projection and identifying a gradient (e.g., where the gradient is indicative of an edge of the potential compound object). In another embodiment, a boundary image may be generated by measuring the intensity of respective pixels and by identifying an edge based on a drop in intensity below some threshold (e.g., 50% of the maximum intensity of the two-dimensional projection). In yet another embodiment, an edge is determined by identifying a change in the pixel value of respective pixels from zero to a predetermined threshold.

The fidelity score is generated by comparing the boundary image with the comparator characteristic, or signature, of one or more known objects. For example, the boundary image may be compared to a morphological characteristic, such as shape and/or thickness, for example, of a known object. To perform such a comparison, in one embodiment, an image of the comparator characteristic, such as a shape characteristic, is overlaid over the boundary image and the size of the image of the comparator characteristic is adjusted so that the size of the image of the shape characteristic is substantially to scale with (e.g., fits) the boundary image. For example, where the shape characteristic is an outline of the gun that is twice the size of the boundary image, the size of the shape characteristic may be adjusted to correspond to the size of the boundary image.

The fidelity score is indicative of the differences between the boundary image and the comparator characteristic, or rather the likelihood that the potential compound object comprises the known object. A low fidelity score generally indicates a low probability that the potential compound object comprises the known object (e.g., there are substantial differences between the boundary image and the comparator characteristic). For example, if the boundary image comprises an oval and the boundary image is compared to a circle, a higher fidelity score may be generated than would be generated if the boundary image were compared to a square. Thus, based upon the fidelity score, it can be determined that there is a higher likelihood that the compound object comprises a sub-object corresponding to the circle than a sub-object corresponding to the square.

It will be appreciated that a plurality of fidelity scores may be computed for the boundary image by comparing the boundary image to a plurality of comparator characteristic of known objects. For example, the boundary image may be compared to the comparator characteristics of a gun, knife, explosive, etc., and a fidelity score for respective comparison may be generated.

At 406, if the first fidelity score meets a first threshold (e.g., 0.85), a masked projection of the potential compound object may be generated by excluding, removing, or otherwise ignoring portions of the projection of the potential compound (e.g., the boundary image) that comprise outliers to the comparator characteristic. Stated differently, when a fidelity score is generated that meets or exceeds a first threshold, there is a high likelihood that the potential compound object comprises a known object. To verify that the potential compound object comprises the known object, portions of the projection of the potential compound object that cause the fidelity score to be lower (e.g., that reduce the likelihood that the potential compound object is the known object) are excluded or masked from the projection.

It will be appreciated that there are numerous analytic and/or iterative ways to mask outliers in a projection, or boundary image, of a potential compound object. For example, in one embodiment, outliers are determined by finding a center area, or center of mass, of the object and dividing the projection, or boundary map, into sectors relative to the central area. Portions of the projection that lie in sectors comprising a distance threshold between the central area and an edge in the projection are masked or excluded. Stated differently, clusters of pixels that are furthest away (e.g., clusters of pixels that meet a distance threshold) from the center area are masked. In this way, one or more outliers (including a largest outlier from the center area) are excluded from the projection, or boundary map. That is, portions of the image that do not conform to the comparator characteristic are ignored and a masked projection (e.g., a boundary map indicative of portions of the potential compound object that are not masked) is generated.

At 408, a second fidelity score for the masked projection of the potential compound object is generated using at least the comparator characteristic of the known object. Stated differently, the comparator characteristic of the known object is refitted (e.g., sized accordingly), for example, and a second fidelity score, different that the first fidelity score, is calculated based upon the differences between the masked projection and the comparator characteristic of the known object.

It will be appreciated that because the masked projection does not include the one or more outliers, the second fidelity score should be higher than the first fidelity score if the potential compound object comprises the known object. If the second fidelity score is equal to and/or exceeds a second threshold that is higher than the first threshold, it is determined that the potential compound object likely comprises the known object, and the potential compound object (e.g., comprising the known object) may be classified as a potential threat or non-threat item. If the second fidelity score is between the first threshold and the second threshold, the projection, or boundary image, may be re-masked (e.g., to discard more outliers) and a third fidelity score may be generated. It will be appreciated that the boundary image may continue to be re-masked and a new fidelity score may be generated iteratively until the fidelity score equals or exceeds the second threshold and/or until the technique has been repeated a predetermined number of times and it is determined that the potential compound object does not comprise the known object and/or it is determined that the results are inconclusive. If the second fidelity score is less than or equal to the first fidelity score, it is unlikely that the potential compound object comprises the known object. Thus, the masked projection may be unmasked and the unmasked projection may be compared to additional comparator characteristics of additional known objects until a fidelity score is generated that exceeds that first threshold. If no fidelity score is generated that meets the first threshold and/or if, once unmasked, no other fidelity score is generated that meets the first threshold, the potential compound object may be classified as indeterminate, and additional inspection of the object may be warranted (e.g., a suitcase may be hand searched to identify the sub-objects of the potential compound object).

At 410 the example method 400 ends.

Figure 5:
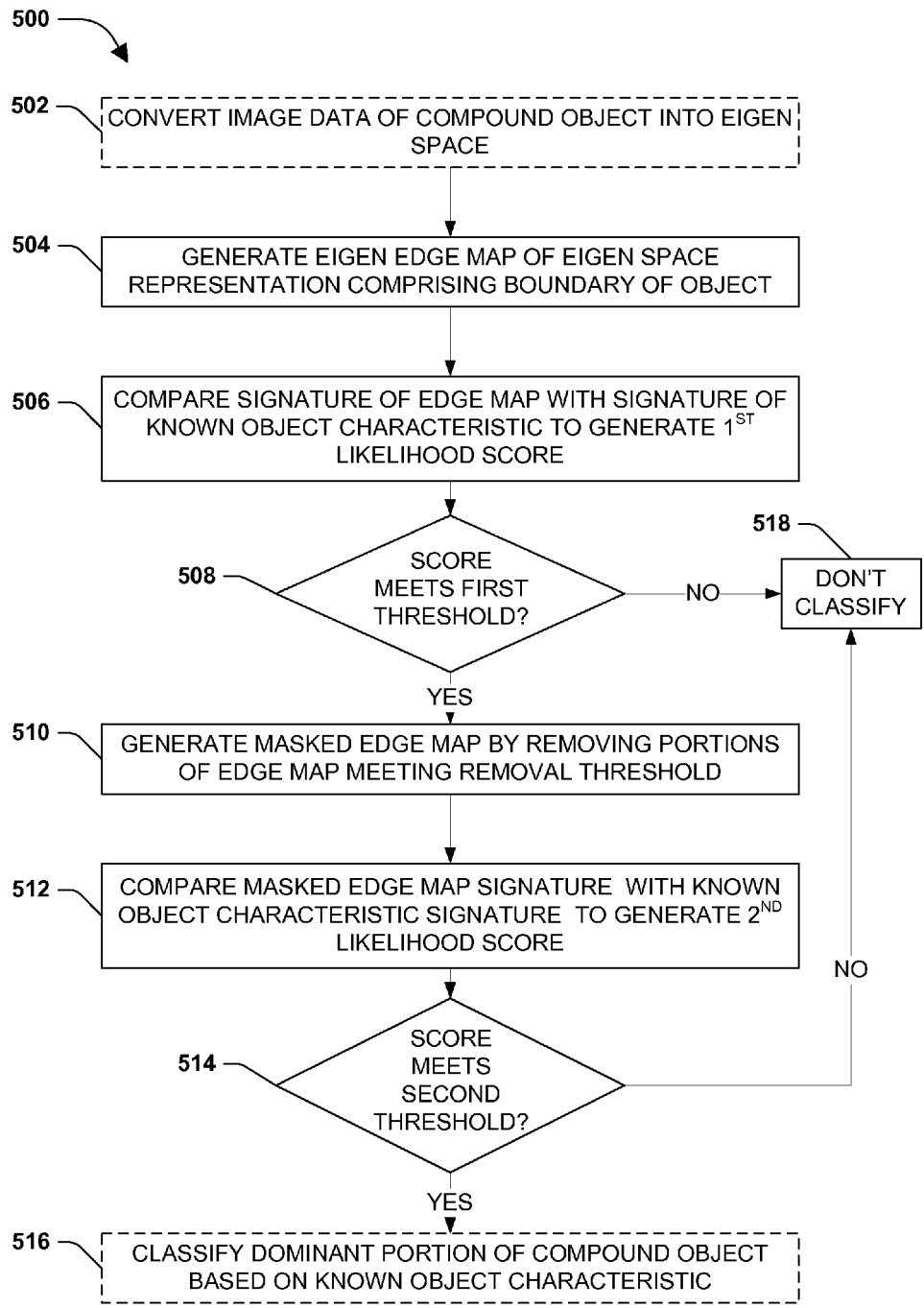
FIG. 5 is a flow diagram of an example method for classifying a potential compound object identified in image data from a radiographic imaging apparatus.

FIG. 5 illustrates a flow diagram of an example method 500 for classifying a potential compound object without performing segmentation of image data of the potential compound object.

At 502, image data of a potential compound object is converted into Eigen space. Stated differently, the potential compound object is analyzed to determine its principal axes (e.g., which may not necessarily be the same as the imaging axes). Generally, the orientation of the principal axes are a function of the size, shape, and/or orientation of the potential compound object, for example, and the principal axes are oriented such that a majority of the surface area of the object is exposed when projected into two-dimensional space. That is, the principal axes are oriented, such that when the potential compound object is flattened into two-dimensional space, the object covers an increased or the largest amount of space possible. Once the principal axes are determined, the voxels are projected into two-dimensional planes normal to respective principal axes to generate a two-dimensional projection in Eigen space. Respective pixels of the two-dimensional projection represent zero or more voxels depending upon the number of voxels that were in the collapsed dimension. For example, where a collapsed row comprised three voxels, the pixel representing the collapsed row is indicative of three voxels. The number of voxels represented by a pixel may be referred to as a "pixel value."

At 504, an Eigen edge map of the Eigen space representation, or Eigen projection, is generated. The edge map depicts boundaries of the potential compound object and may be generated using Eigen edge map techniques known to those skilled in the art. For example, in one embodiment, an Eigen edge map is generated by thresholding the Eigen projection and identifying portions of the projection where there is a gradient (e.g., an area where the pixel values of respective pixels begin to more rapidly increase or decline). In another embodiment, edges of the potential compound object can be identified in the Eigen projection by identifying areas of the projection where the intensity rolls off to a level below a predetermined threshold. It will be appreciated that other techniques for generating an Eigen edge map from an Eigen projection are also contemplated and the techniques described herein are merely example techniques.

At 506 a signature of the Eigen edge map is compared to a signature of a known object characteristic to generate a first likelihood score, or fidelity score. In one embodiment, one or more morphological characteristics of potential compound objects are compared with one or more similar morphological characteristics of the known object(s). For example, the shape of the Eigen edge map may be compared to shapes of one or more known objects to determine if a dominant sub-object (e.g., a sub-object that makes up a large percentage of the potential compound object) has a similar shape as (and is likely to be) the known object. In another example, the thickness of the potential compound object is compared to the thickness of one or more known objects.

At 508 it is determined whether the first likelihood score meets a first threshold. If the score does not meet the first threshold, it is determined that at least the dominate portion (e.g., the dominant sub-object) does not comprise the known object and the potential compound object is not classified 518 as comprising the known object. In one embodiment, if the first likelihood score does not meet the first threshold, the same signature and/or a different signature of the edge map can be compared to signatures of other known objects to determine if there are any comparisons which may generate a likelihood score that meets the first threshold. For example, a shape signature may be compared against the shape signatures of one thousand known objects to determine if any one of the comparisons results in a likelihood score that meets or exceeds the first threshold.

If the score does meet the first threshold, a masked edge map is generated by excluding portions of the edge map meeting an exclusion threshold at 510. That is, at least some portions of the edge map that cause the signature of the edge map to not substantially match the signature of the known object are masked or otherwise hidden such that a masked projection edge map (e.g., that ignores or hides the masked portion) is generated. In one embodiment, the edge map is divided into sectors, and sectors that fall outside of a predetermined range from the mean (with respect to the compared characteristic) are masked. For example, where the compared characteristic, or the signature, is shape, a central area of the edge map can be found and the edge map can be divided into sectors relative to the central area. After the edge map is divided into sectors, sectors that are distant from the central area (e.g., as determined by a predetermined threshold) may be masked. In this way, the edge map is refined to exclude (small) portions of the edge map that interfere with the calculation of the fidelity score. Stated differently, by masking portions of the edge map, data indicative of sub-objects that make up a small portion of the potential compound object are excluded (or are intended to be excluded).

At 512, the masked edge map signature is compared with the signature of the known object characteristic to generate a second likelihood score. That is, the masked edge map signature is compared with the same signature that the edge map was originally compared with to generate the first threshold. If the likelihood score meets a second threshold 514 that is greater than the first threshold, the dominate portion of the compound object (e.g. the portion represented by the remaining edge map that was not masked) is classified based on the known object characteristic at 516. For example, if a shape represented by the masked edge map is compared against the shape of a gun and the likelihood score meets or exceeds the second threshold, the dominant portion of the compound object may be classified as a gun, or more generally as a potential threat item (e.g., and a hand search of the luggage may be performed).

If the second likelihood score does not meet or exceed the second threshold at 514, the potential compound object may not be classified at 518 (e.g., because it is unknown whether the potential compound object comprises a potential threat item) and/or the masked edge map may be compared against signatures of other known objects to determine if there is a possibility that a dominate object in the potential compound object comprises a different, known object. Further, in one embodiment, the Eigen edge map may be unmasked and compared against signatures of other known objects to identify a dominate object. In one example, if a dominate object of the potential compound object cannot be identified as a known object and/or cannot be as a potential threat item/non-threat item, an indication is sent to a terminal (e.g., 144 in FIG. 1) to indicate that the results of the classification techniques described herein could not classify a potential compound object (e.g., and thus additional, such as manual, searching may need to be performed).

Figure 6:
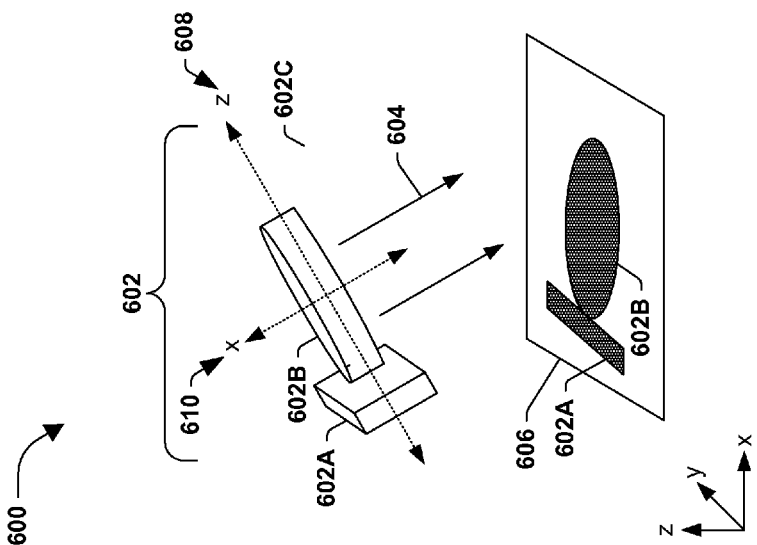
FIG. 6 is a graphical representation of three-dimensional image data being projected onto a two-dimensional projection.

FIG. 6 is a graphical representation 600 of three-dimensional image data 602 being projected 604 onto a two-dimensional projection 606, such as an Eigen projection, for example. The three-dimensional image data 602 is representative of a compound object comprising two sub-objects 602A, 602B. For example, the potential compound object may be comprised of a book 602A and a cake pan 602B. To improve the quality of the sub-object identification/classification, the voxels of the object are projected onto the two-dimensional projection 606 normal to its principal axes 608, 610, where the principal axes 608, 610 are defined based upon the amount of surface area that would be exposed in the two-dimensional projection 606. For example, as illustrated, the principle axis 608, 610 of the object are tilted approximately 45 degrees relative to the surface of the projection 606 so that the maximum amount of surface area of the three-dimensional image data 602 is exposed on the two-dimensional projection 606.

Figure 7:
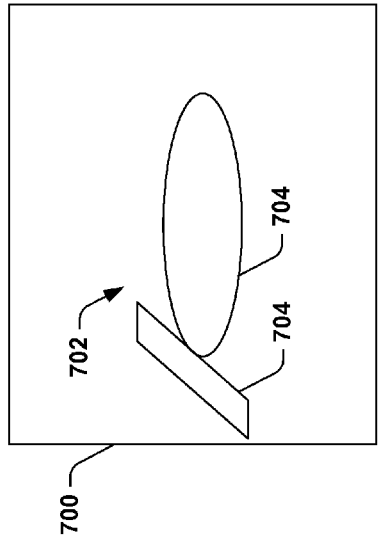
FIG. 7 is a graphical representation of an example edge map.

FIG. 7 is a graphical representation 700 of an example edge map 702, such as an Eigen edge map, which may be generated based upon the two-dimensional projection 606 in FIG. 6, for example. As illustrated, generally the edge map merely depicts the edges 704 of the objects represented in the two-dimensional projection 606. That is, portions of the two-dimensional projection 606 that are not representative of an edge 704 of the potential compound object are removed or otherwise hidden such that merely the edges 704 of the sub-objects comprised within the compound object are illustrated. It will be appreciated that numerous techniques to generate an edge map from a two-dimensional projection are known in the art, and several such techniques are described above.

Figure 8:
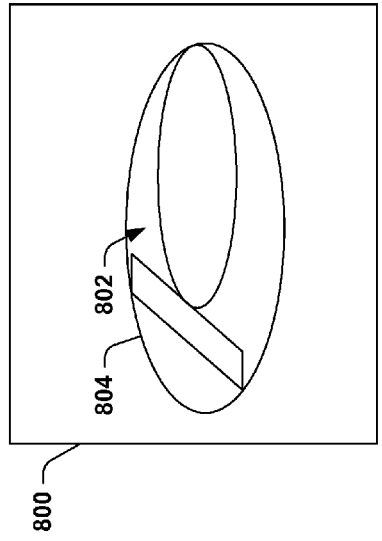
FIG. 8 is a graphical representation wherein an edge map is compared to a signature of a known object.

FIG. 8 is a graphical representation 800 where an edge map 802 (e.g., 700 in FIG. 7) is compared to a signature 804, or comparator characteristic, of a known object and a fidelity score is generated indicative of the likelihood that the potential compound object comprises the known object, or indicative of the degree of similarity/difference between the signature 804 and the edge map 802. Here, the signature 804 is a shape (e.g., an oval), but it will be appreciated that in other embodiments, the signature may be a different characteristic of the known object, such as thickness and/or another morphological characteristic, for example.

If the fidelity score, also referred to herein as a likelihood score, is above a first threshold, portions of the edge map may be masked (e.g., to determine if the likelihood that the potential compound object comprises the known object increases). For example, with reference to FIG. 8, the comparison of the signature 804 with the edge map 802 may result in a fidelity score of 0.85 (e.g., a score above the threshold). Thus, there is a relatively high potential that the potential compound object comprises the known object that is associated with the signature.

Figure 9:
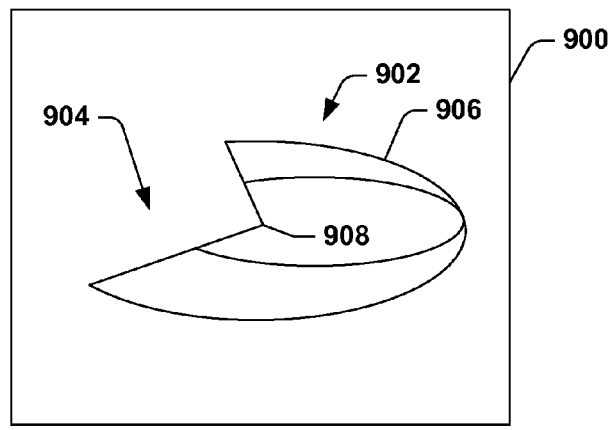
FIG. 9 is a graphical representation of a masked projection.

FIG. 9 is a graphical representation 900 of a masked projection 902, which may be generated based upon a finding that a comparison between an edge map 802 and a signature 804 yields a fidelity score that is greater than or equal to a first threshold. As illustrated, a portion 904 of the edge map 802 which caused the fidelity score to be reduced is masked. In one embodiment, to determine which portion 904 of the edge map 802 to exclude, a central area 908, or central mass, of the image (e.g., which may not be the center of the edge map 802) is identified, and the edge map 802 is broken into sectors relative to the central area 908. Sectors that are furthest away from the central area 908, or rather portions of the edge map 802 that lie in sectors a predetermined distance from the central area 908 are excluded. For example, here sectors indicative of the book 602A are masked because those sectors did not conform to the shape of the signature 906 (e.g., 804 in FIG. 8).

Figure 10:
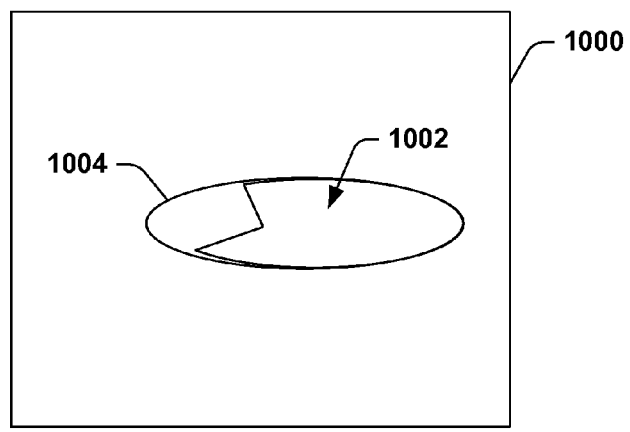
FIG. 10 is graphical representation of a masked projection being compared to a signature of a known object.

Once a masked projection 902 is generated, a new fidelity score can be generated by comparing the signature to the masked projection 902 (e.g., which comprises portions of the edge map that were not masked). FIG. 10 illustrates a graphical representation 1000 of a masked projection 1002 (e.g., 902 in FIG. 9), being compared to the signature 1004 (e.g., 804 in FIG. 8) of the known object, which has been resized to fit the masked projection 1002. As illustrated, the signature 1004 substantially matches the shape of the masked projection 1002, and thus the sub-object 602B of the potential compound object may be classified as the known object and/or classified as a potential threat and/or non-threat item based upon the characteristics of the known object (e.g. based upon whether the known object is and/or can be used as a weapon).

Figure 11:
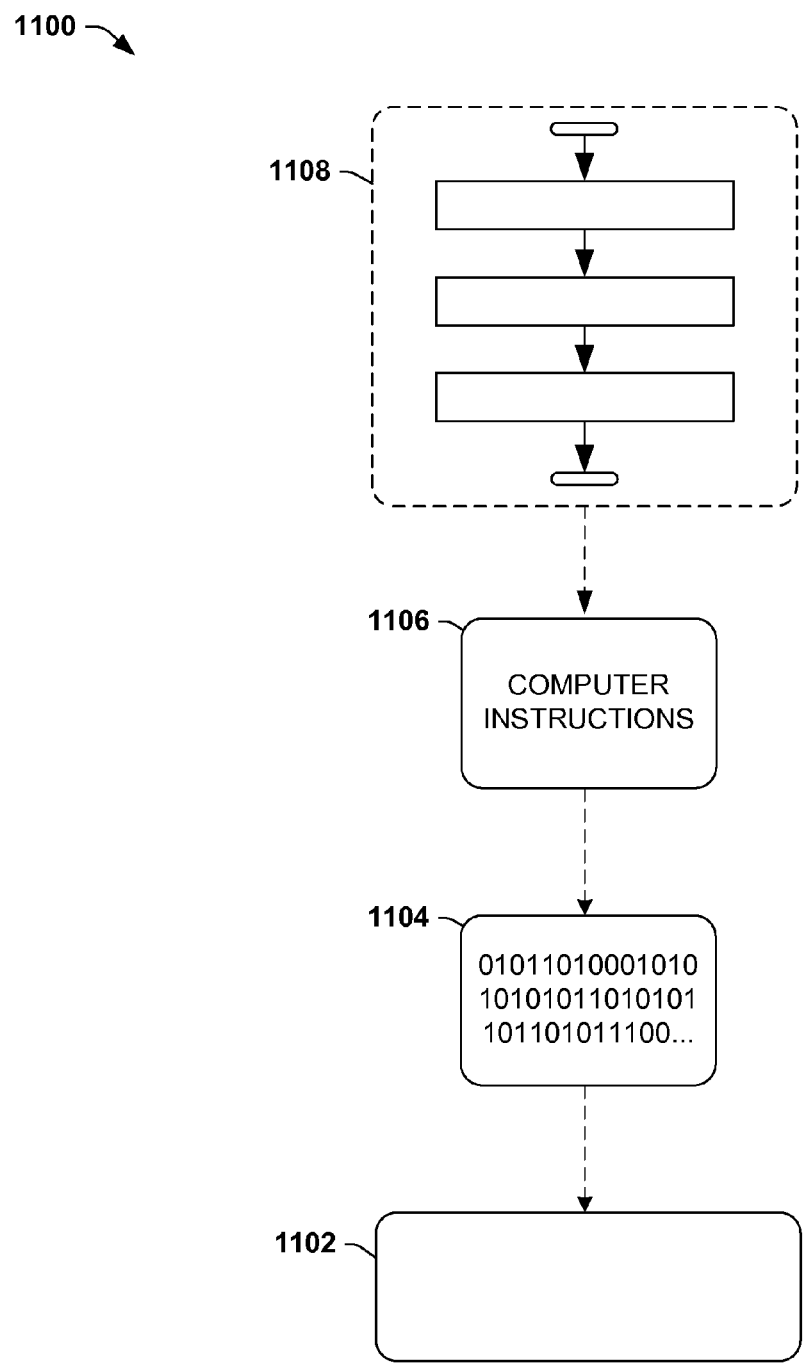
FIG. 11 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 11, wherein the implementation 1100 comprises a computer-readable medium 1102 (e.g., flash drive, a CD-R, DVD-R, or a platter of a hard disk drive), on which is encoded computer-readable data 1104. This computer-readable data 1104 in turn comprises a set of computer instructions 1106 configured to operate according to one or more of the principles set forth herein. In one such embodiment 1100, the processor-executable instructions 1106 may be configured to perform a method 1108, such as the example method 400 of FIG. 4 and/or 500 in FIG. 5, for example. In another such embodiment, the processor-executable instructions 1106 may be configured to implement a system, such as at least some of the exemplary system 100 of FIG. 1, for example. Many such computer-readable media may be devised by those of ordinary skill in the art that are configured to operate in accordance with one or more of the techniques presented herein.

It will be appreciated that there are numerous benefits to the systems and/or techniques described herein relative to other sub-object identification techniques, such as compound object splitting. For example, unlike compound splitting techniques which generally map the information from three-dimensional space to two-dimensional space and back again to three-dimensional space, the sub-object identification described herein is done in two-dimensional space (e.g., the information does not have to be remapped back into three-dimensional space). Thus, fewer computations are required. Additionally, less computation power is required because the compound object does not have to be segmented as is typically done when compound splitting techniques are performed. Moreover, the techniques described herein can be performed on single and/or multi-energy examination systems, and thus the applicability of the techniques described herein can be used in conjunction with a wide range of imaging devices.

Moreover, the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for classifying a potential compound object, comprising:
    generating a first fidelity score for a projection of the potential compound object, where the first fidelity score represents a likelihood that the potential compound object comprises a comparator characteristic of a known object;
    if the first fidelity score meets a first threshold, generating a masked projection of the potential compound object by excluding portions of the projection of the potential compound object that comprise outliers to the comparator characteristic, comprising:
        identifying a distance between an edge of the potential compound object in the projection and a central point of the comparator characteristic; and
        masking out one or more portions of the potential compound object in the projection that meet a distance threshold for removal; and
    generating a second fidelity score for the masked projection of the potential compound object using the comparator characteristic of the known object, at least some of the method implemented at least in part via a processing unit.

2. The method of claim 1, comprising generating a boundary image of the potential compound object in the projection prior to the generating a first fidelity score.

3. The method of claim 1, comprising:
    generating an Eigen projection of the potential compound object; and
    generating an Eigen edge map image of the Eigen projection of the potential compound object.

4. The method of claim 1, wherein the comparator characteristic comprises a morphological characteristic.

5. The method of claim 4, the generating a first fidelity score comprising:
    comparing a morphological characteristic of the potential compound object in the projection with the morphological characteristic of the known object; and
    computing the first fidelity score for the potential compound object based on the comparison.

6. The method of claim 1, the generating a first fidelity score comprising:
    overlaying an image of a shape characteristic over an image of the potential compound object in the projection; and
    adjusting a size of the image of the shape characteristic so that the size of the image of the shape characteristic is to scale with the image of the potential compound object in the projection.

7. The method of claim 6, the generating a masked projection of the potential compound object comprising:
    finding a central area of the image of the shape characteristic;
    dividing the adjusted image of the shape characteristic into sectors relative to the central area; and
    masking out one or more portions of the image of the potential compound object in the projection that lie in sectors comprising a distance threshold between the central area and an edge in the image of the potential compound object.

8. The method of claim 1, the masking out one or more portions of the potential compound object in the projection comprising masking out a portion of the potential compound object in the projection that comprises a largest outlier portion from the central point.

9. The method of claim 1, comprising refitting the comparator characteristic to the masked projection.

10. The method of claim 9, if the second fidelity score meets a second threshold, different than the first threshold, classifying the masked projection based on the known object.

11. The method of claim 1, comprising classifying a dominant portion of the potential compound object using the comparator characteristic if the second fidelity score for the masked projection of the potential compound object meets a second threshold, different than the first threshold.

12. A system for classifying a potential compound object, comprising:
    one or more processing units; and
    memory comprising instructions that when executed by at least one of the one or more processing units perform operations, comprising:
        generating a first fidelity score for a projection of the potential compound object that represents a likelihood that one or more portions of the potential compound object comprise a comparator characteristic of a known object, comprising:
            overlaying an image of a shape characteristic over an image of the potential compound object in the projection; and
            adjusting a size of the image of the shape characteristic so that the size of the image of the shape characteristic is to scale with the image of the potential compound object in the projection;
        generating a masked projection of the potential compound object by masking out one or more portions of the projection of the potential compound object that comprise outliers to the comparator characteristic, if the first fidelity score meets a first threshold, comprising:
            finding a central area of the image of the shape characteristic;
            dividing the adjusted image of the shape characteristic into sectors relative to the central area; and
            masking out a portion of the image of the potential compound object in the projection that lies in a sector comprising a distance threshold between the central area and an edge in the image of the potential compound object; and generating a second fidelity score for the masked projection of the potential compound object using the comparator characteristic of the known object.

13. The system of claim 12, comprising generating the projection of the potential compound object using three-dimensional image data of the potential compound object.

14. The system of claim 13, the generating the projection comprising mapping the projection to Eigen space.

15. The system of claim 12, comprising generating an edge map image of the projection of the potential compound object and the generating a first fidelity score comprising generating the first fidelity score using the edge map image.

16. The system of claim 15, wherein the edge map image is an Eigen edge map.

17. The system of claim 12, the generating a first fidelity score comprising generating the first fidelity score for an unmasked potential compound object in the projection.

18. The system of claim 12, wherein the comparator characteristic is derived from a library of known comparator characteristics.

19. A method for classifying a potential compound object identified in image data from a radiographic imaging apparatus, comprising:
    generating an Eigen edge map of an Eigen space representation of the potential compound object, where the Eigen edge map comprises merely a boundary representation of the potential compound object in Eigen space;
    comparing a signature of the Eigen edge map with a signature of a known object characteristic to generate a first likelihood score;
    if the first likelihood score meets a first threshold, removing portions of the Eigen edge map that meet a removal threshold based on the known object characteristic to generate a masked Eigen edge map, comprising:
        identifying a distance between an edge of the potential compound object in the Eigen edge map and a central point of the signature of the known object characteristic; and
        masking out one or more portions of the potential compound object in the Eigen edge map that meet a distance threshold for removal; and
    comparing a signature of the masked Eigen edge map with the signature of the known object characteristic to generate a second likelihood score.

20. The method of claim 19, comprising converting three-dimensional image data of the potential compound object into the Eigen space representation of the potential compound object.

21. The method of claim 19, comprising classifying a dominant portion of the potential compound object based on the known object characteristic if the second likelihood score meets a second threshold.

22. The method of claim 19, wherein the known object characteristic comprises a morphological characteristic.

\* \* \* \* \*